United States Patent Office 3,574,810
Patented Apr. 13, 1971

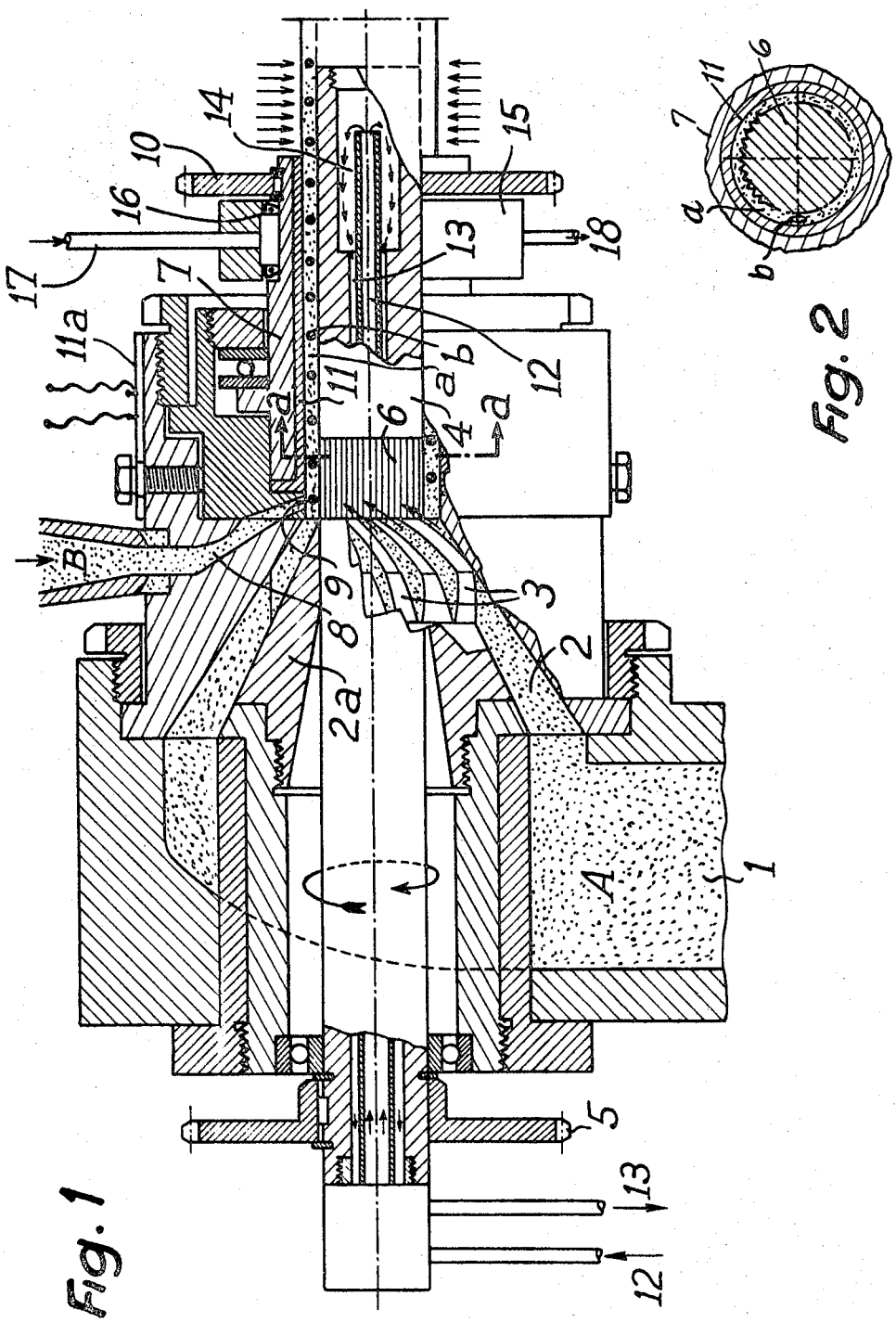

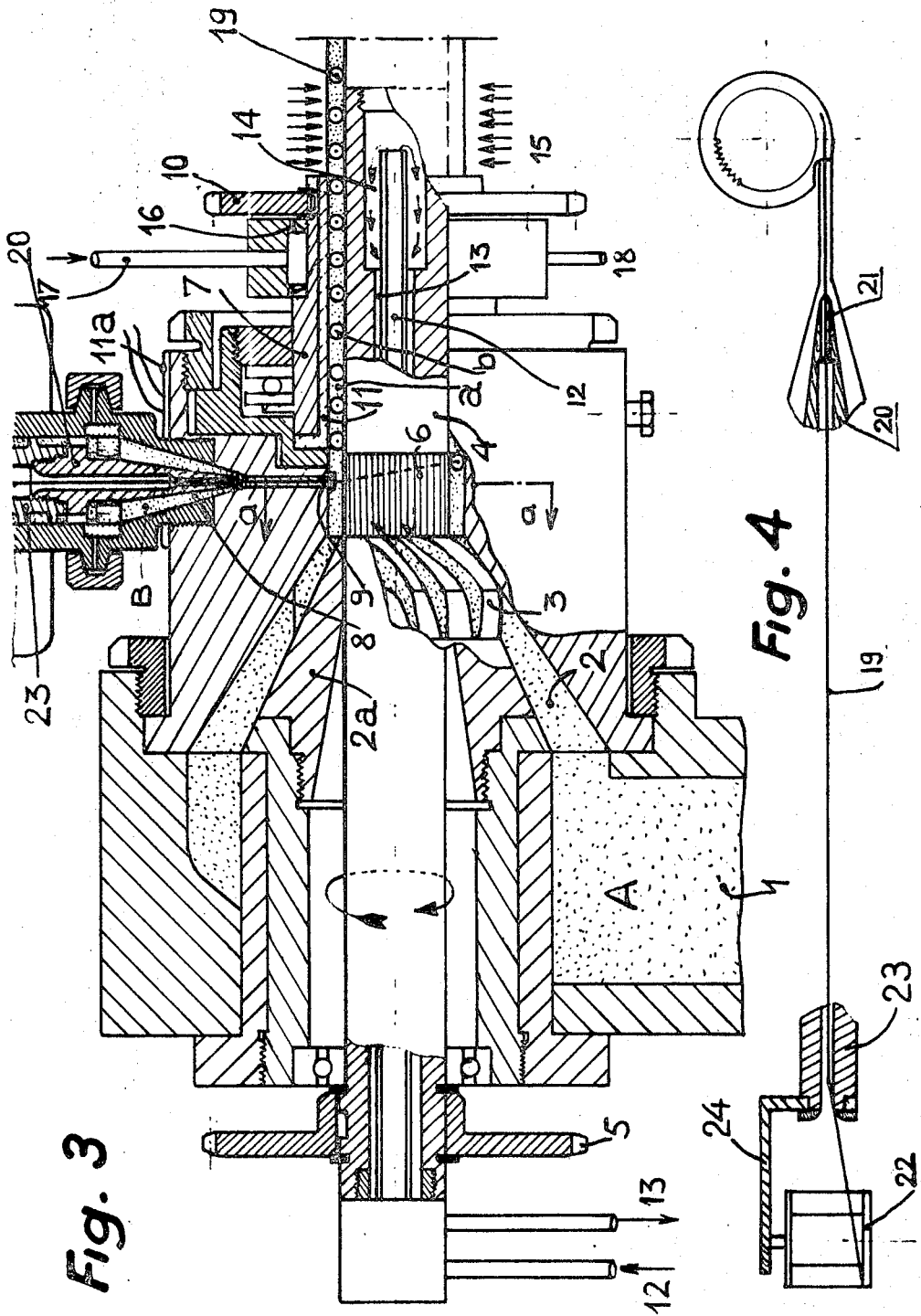

3,574,810
METHOD FOR MANUFACTURING PIPES POSSESSING THERMOPLASTIC REINFORCEMENT
Jacques Tournery, Clermont-Ferrand, and Fernand Tuyeras, Aulnat, France, assignors to Pneumatiques, Caoutchouc Manufacture et Plastiques Kleber-Colombes, Colombes, France
Filed Mar. 13, 1968, Ser. No. 712,819
Claims priority, application France, Mar. 15, 1967, 98,978; June 9, 1967, 109,899
Int. Cl. B29d 23/04; B29f 3/10
U.S. Cl. 264—173                    5 Claims

ABSTRACT OF THE DISCLOSURE

This invention relates to the manufacture of thermoplastics pipes in which a reinforcement is contained within a wall thereof, the reinforcement also being made from thermoplastics material and in the form of a helically wound ring. In accordance with this invention, a continuous cylinder is extruded in a machine to form the wall of the pipe and, in the same machine, the reinforcing ring is extruded inside the cylinder: the point of application of the reinforcing ring and the cylinder being relatively rotated along the axis of the cylinder itself.

---

The invention relates to a method of for manufacturing pipes composed of a wall made of thermoplastics material and a reinforcement, also made of a thermoplastics material, in the form of a helically wound ring embedded in the wall.

The term "thermoplastics material" as used in this specification means any material which may be in a relatively fluid state and which may subsequently become solid either due to cooling or due to modifications made in its internal structure.

Such pipes are already being made by helically winding a rectilinear tape which includes the reinforcing ring.

In certain cases, this tape is prepared during a previous operation and, during another operation, is then helically wound and welded edge to edge.

In other cases, during the same operation effected in the same apparatus, the tape including the reinforcing ring is prepared and wound and the edges are welded.

These methods do not enable pipes which have appropriate characteristics to be obtained or they are difficult to develop and necessitate complex and costly equipment.

It is also known to manufacture such pipes by extruding, simultaneously and in the same apparatus, two coaxial tubes and by winding the reinforcing ring in the space separating the two tubes, and, finally, by passing the whole into an annular space so that the parts are welded together.

This method and the corresponding device also do not enable satisfactory pipes which have appropriate characteristics to be obtained. This is doubtlessly due to the difficulty in welding the different parts together due to the inevitable presence of cracks and air bubbles between the different parts.

The present invention has for an object a method of manufacture which may easily be carried out without resorting to costly apparatus.

It also has for an object a method of for manufacturing pipes which have excellent characteristics.

It must be understood that the method and the apparatus according to the method of the invention are applied to the manufacture of all pipes constituted of thermoplastics material as defined previously, whatever the nature of these materials. In particular, the reinforcement may be made of a material of the same nature as the wall, for example of polyvinyl chloride which is not plasticised or which is less plasticised than that of the wall or may be made of a thermoplastics material of a different nature.

According to the method of the invention, the thermoplastics material forming the wall of the pipe is extruded in the form of a continuous cylinder in the same apparatus and simultaneously, whilst this thermoplastics material is in a relatively fluid state, the reinforcing ring is extruded into the said cylinder, the continuous cylinder of thermoplastics material and the ring being moved with respect to one another, by a rotary movement along the axis of the cylinder; in other words, the cylinder made of thermoplastics material is moved by a rotation on itself, the point of application of the ring in this cylinder being fixed with respect to the apparatus used or the point of application of the ring describes a circle perpendicular to the axis of the cylinder made of plastics material.

An apparatus according to the invention which enables the said method to be carried out, comprises in particular a mandrel, coaxial to a die, conduits for carrying the plastics material forming the wall of the pipe in the space between the mandrel and the die and conduits for carrying the thermoplastics material forming the reinforcement issuing, through nozzles, into the space between the die and the mandrel, slightly downstream of the conduits carrying the thermoplastics material forming the wall, and means ensuring the relative rotation of the nozzles for the plastics material of the reinforcement and of the wall of the pipe.

The invention will be described in greater detail with the aid of the following embodiments given by way of non-limiting example and illustrated in the accompanying drawings, in which:

FIG. 1 shows a first embodiment of apparatus according to the invention,

FIG. 2 shows a section along the line a—a through the mandrel of FIG. 1,

FIG. 3 shows another embodiment of apparatus according to the invention,

FIG. 4 shows a schematic view along the line a—a of FIG. 3, and

Figure 5:
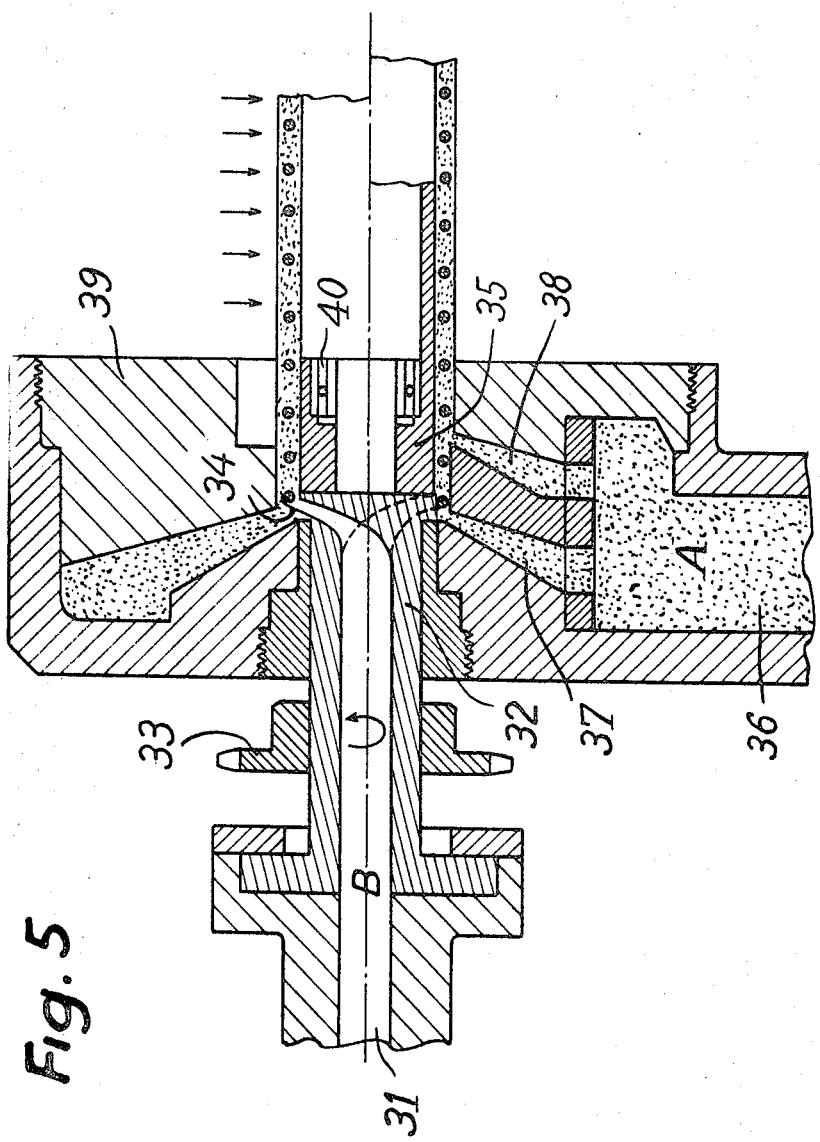
FIG. 5 shows a third embodiment of apparatus according to the invention.

In all the cases to which these embodiments refer, extruding means (which have not been shown in the drawings), feed the apparatus with thermoplastics materials; one supplies it with the material which will form the wall of the pipe and which will be referred to as material A, the other feeds it with the material which will form the reinforcing ring and which will be referred to as material B.

In the embodiments corresponding to FIGS. 1 to 4, it is the continuous cylinder formed by the material A which is moved by a rotation on itself, the point of application of the reinforcement remaining fixed.

In the apparatus of FIG. 1, the material A fed from thes extruding apparatus is received in a cylindrical chamber 1 and from there passes into an annular chamber 2 which surrounds a conical member 2a; the chamber 2 extends as far as a mandrel 4 by conduits defined by helical fins 3. The passage of the material A into these helical conduits imparts to it a first movement of rotation.

The material A, whilst it is moved by this first action, is received by the rotary mandrel 4, coaxial with the conical member 2a. The mandrel 4 is rotated by a pinion 5. At a spot situated after that where the material A is received and over a certain length, the mandrel 4 carries on its external surface grooves or longitudinal flutes 6 which have for their effect to perfect the rotation of the material A.

As will be seen in the following, a die 7, which surrounds the mandrel 4, may also be rotated.

Thus, the continuous cylinder formed by the material A and constittuing the wall $a$ of the pipe is rotated by a combination of the means described previously. It is also translated by the continuous longitudinal supply of material A.

The material B which will form the reinforcement, enters the apparatus through a conduit 8 which opens near and downstream of the end of the conduits through which the material A passes. An output nozzle 9 of the conduit 8 is orientated along the tangent to the helix which will form the reinforcement and it is extended so that the reinforcement is positioned in the wall of the cylinder formed by the material A. The section of the nozzle 9 may take any desired form; in particular, it may have a section which, taking into account the deformation which the section of the reinforcement will undergo following its rotation and its displacement, gives the located reinforcement the section which it is desired to obtain.

The material B is driven by the movement of translation and simultaneously by the rotation of the material A, this causing it to be helically wound.

The pipe thus constituted is formed by a wall $a$ in which is embedded the reinforcement $b$.

Instead of being deposited by a single conduit 8, the material B may be deposited by a plurality of conduits, this increasing the capacity of production of the device. In this case, the conduits may be placed in the same plane tangentially to the helix by being longitudinally shifted wtih respect to one another by a length equal to the quotient of the pitch of the helix by the number of conduits; they may also be placed in opposition so that, as they are always oriented along a tangent to the helix, their openings are in the same plane perpendicular to the axis of the helix and are spaced around the circumference by arcs equal to $2\pi/n$, $n$ designating the number of conduits.

The die 7 which surrounds the mandrel 4 may also be rotated by a pinion 10.

The die 7 may be provided on its internal face with a coating of a material 11 such as polytetrafluoroethylene known under the commercial name of Teflon, presenting a good slip coefficient and inert with respect to the material A.

The device is advantageously heated at the part where the reinforcement is placed in the wall, for example, by radiation from a heating cylinder 11$a$.

The rotary mandrel 4 is hollow and has a cooling system at its end. A fluid, for example, water, is caused to circulate in an inlet conduit 12 and arrives in an end chamber 14 where it leaves again through a return conduit 13. The conduits 12 and 13 are thermally insulated in the part which is heated by the heating cylinder 11$a$ in order to avoid heat exchanges in this region.

A rotary casing 15 provided with a rotary joint 16 and fed by fluid such as water circulating in conduits 17 and 18, may also be arranged at the end of the die.

Air or a mist of water may be conveyed to the pipe which passes over the part of the mandrel which projects beyond the die. The rapid cooling of the pipe at the end of the mandrel stabilises it and brings about a sufficient hardening so that it may be subjected to other treatments later, if desired. In order that this latter operation is effective enough, the mandrel must project beyond the die by a sufficient length.

The apparatus shown in FIG. 3 is similar to that of FIG. 1 but adapted so as to be able to include, in the reinforcing ring, a textile or metal core. For this reason, identical parts are designated by reference numerals common to FIGS. 1, 2, 3 and 4.

The inlet of the thermoplastics material B, which is relatively rigid and intended to form the reinforcement, which is produced by the conduit 8 and the nozzle 9, has been offset downstream so that the material B from the extruding apparatus supplying it until it is positioned in the wall in a direction tangential thereto, follows a substantially rectilinear path. This arrangement which, as will be seen in the following, prevents the core of the reinforcing ring from being curved, is also favourable when it is desired to manufacture pipes whose reinforcing ring does not comprise a core. In fact, and this is an important advantage, the same installation enables pipes to be manufactured whose reinforcing ring may or may not be provided with a core.

A core 19 for the reinforcing ring $b$ is a textile or metal wire, strand or cable; it is wound on a spool 22 and it passes through a channel formed in a screw 23 of the extruding apparatus producing the reinforcing ring $b$ which is made of the material B. After having passed into the channel of the extruding screw, the core 19 passes through a tip 20 of the screw through a channel 21 whose diameter is substantially the same as that of the core 19. The core 19 is driven by the thermoplastics material B which leaves the extruding apparatus and in which it is embedded. In order to avoid any twisting or untwisting of the core, it is advantageous to impart to the spool 22, by a known means not forming part of the invention, the same movement of rotation as that which is imparted to the 23 of the extruding apparatus; for example, the spool 22 and the screw 23 of the extruding apparatus may be connected to rotate together by means shown at 24.

Of course, if necessary, the core 19 may be subjected to any known suitable treatment, not forming part of the invention, enabling it to be rendered adherent to the material B.

Generally, it is advantageous, as in this embodiment, to ensure that the core 19 and the material $b$, in which it is positioned, follow a rectilinear path until the reinforcing ring $b$, comprising the core 19, is extruded in the wall $a$ of the pipe; this in fact permits the exact positioning of the core in the reinforcing ring.

In the embodiment of FIG. 5, the output nozzle or nozzles of the reinforcing ring are rotated with respect to the axis of the cylinder formed by the material A which is translated only.

The material B is introduced into the device through a conduit 31 which passes through a mandrel 32 and which opens out on the periphery and at the end of the mandrel 32, through a nozzle 34. The mandrel 32 rotates about its axis, the movement of rotation being given thereto by a pinion 33.

A fixed mandrel 35 which is surrounded by a die 39 is in alignment with the rotating mandrel 32.

The material A is introduced into a cylindrical chamber 36 and from there passes through an annular chamber 37 which opens into the whole periphery of the rotating mandrel 32, at the end of this latter and slightly upstream of the nozzle 34. Although the material A is received on the rotating mandrel 32, the distance and the time of contact of the material A with this mandrel are too short for it to be rotated; the material A which forms a tube is only translated by the continuous feed, which is made under pressure, of the material A. In fact, everything happens as if the material A were received on a fixed mandrel.

The material B is extruded, by the nozzle 34, in the form of a ring placed in the wall which has just been formed.

The combination of movement of translation of the material A which forms the wall of the pipe and the movement of rotation imparted to the material B by the nozzle 34, causes this ring which constitutes the reinforcement to be helically wound.

The device may comprise a plurality of annular chambers feeding material A; in the apparatus shown in FIG. 5, a second annular chamber 38 opens into the fixed mandrel 35, downstream of the annular chamber 37 and downstream of the rotating nozzle 34. The addition of material A fed from the annular chamber 37 is thus completed; by using an appropriate number of successive annular chambers, the wall of the pipe is given any desired thickness. To this end, it will be noted that the distance between the die 39 and the mandrels 34 and 35 is smaller between the chambers 37 and 38 than downstream of the chamber 38.

The nozzle 34 through which the material B issues in the form of a ring in the wall of the pipe, is oriented along a tangent to the helix formed by the reinforcement; it may have any suitable profile.

The material B may also be made to arrive through a plurality of nozzles carried by the rotating mandrel 32; in this case, the conduit 36 is terminated by an annular chamber inside the mandrel 32, from which other narrower conduits extend which connect this internal chamber to a plurality of nozzles regularly spaced out on the periphery of the mandrel 34 and arranged so that their ends are situated in a plane perpendicular to the turn of the winding.

As was stated previously the mandrel 35 does not rotate due not only to the fact that there is no rotary movement of the pipe, but also to the fact that the viscosity of the thermoplastics material counteracts any tendency of the mandrel to rotate and because the mandrel 35 is associated with the rotary mandrel 32 only through ball bearings 40.

The output die 39 is not free to rotate and it may be provided with a coating made of a material having a low coefficient of friction with respect to the material used for manufacturing the pipe; this coating may, for example, be made of polytetrafluoroethylene such as that sold under the trademark "Teflon." The mandrel 35 may also be adapted, for example, in the same way, so that it, too, presents a very low coefficient of friction with respect to the material A.

At the end of extrusion, the pipe is subjected to a rapid cooling which stabilises, calibrates and hardens it sufficiently for it to be further treated, if required. For Example, cold air or water will be provided, the mandrel 35 then projecting by a length which is sufficient for this treatment to be effected.

We claim:

1. A method of manufacturing a pipe having a wall of thermoplastics material provided with a reinforcement, comprising the steps of extruding the thermoplastics wall material into a tubular die in a flow which is continuous around the circumference of the die, extruding a reinforcement members of thermoplastics material as it issues from an extruder in a plastic state into the thermoplastics wall material in the same region of the die as that in which the thermoplastics wall material is introduced, and providing relative rotary movement about the longitudinal axis of the die between the reinforcement member and the thermoplastics wall material at the point of entry of the reinforcement member into the thermoplastics wall material during extrusion of the thermoplastics material through the die whereby a helical reinforcement is provided within the wall of the extruded pipe.

2. A method according to claim 1 including the step of rotating the thermoplastics material relative to the point of entry of the reinforcement member.

3. A method according to claim 1 including the step of rotating the point of application of the reinforcement member about the longitudinal axis of the tubular die relative to the thermoplastics material introduced into the die.

4. A method according to claim 2 including the step of extruding the reinforcement member through a die about a wire-like core before it is introduced into the thermoplastics material.

5. A method according to claim 4 including the step of rotating both the die through which the reinforcement member is extruded and the wire-like core as it is being supplied to the extrusion die about the longitudinal axis of the tubular die at the same angular speed.

References Cited
UNITED STATES PATENTS

| | | | |
|---|---|---|---|
| 3,281,897 | 11/1966 | Mercer | 264—176(X) |
| 3,004,286 | 10/1961 | Klein | 264—173 |

FOREIGN PATENTS

| | | | |
|---|---|---|---|
| 739,434 | 7/1966 | Canada | 204—173 |
| 6700553 | 8/1967 | Netherlands | 264—173 |

ROBERT F. WHITE, Primary Examiner

J. R. THURLOW, Assistant Examiner

U.S. Cl. X.R.

18—13; 264—209